(12) United States Patent
Hakewill et al.

(10) Patent No.: US 10,642,618 B1
(45) Date of Patent: May 5, 2020

(54) CALLGRAPH SIGNATURE PREFETCH

(71) Applicant: Apple Inc., Cupertino, CA (US)

(72) Inventors: James R. Hakewill, Los Gatos, CA (US); Nikhil Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 15/171,316

(22) Filed: Jun. 2, 2016

(51) Int. Cl.
*G06F 9/38* (2018.01)
*G06F 12/0875* (2016.01)

(52) U.S. Cl.
CPC ........ *G06F 9/3802* (2013.01); *G06F 12/0875* (2013.01); *G06F 2212/452* (2013.01)

(58) Field of Classification Search
CPC .... G06F 9/3802; G06F 9/3848; G06F 9/3004; G06F 9/3861
USPC ......................................................... 712/207
See application file for complete search history.

(56) References Cited

U.S. PATENT DOCUMENTS

| | | | |
|---|---|---|---|
| 7,043,608 B2 | 5/2006 | Sun | |
| 7,802,236 B2 | 9/2010 | Calder et al. | |
| 7,890,933 B2 | 2/2011 | Smith et al. | |
| 8,756,582 B2 | 6/2014 | Serrano | |
| 2013/0246708 A1* | 9/2013 | Ono | G06F 12/0862 711/122 |
| 2014/0143522 A1* | 5/2014 | Saidi | G06F 12/0862 712/207 |
| 2014/0149678 A1* | 5/2014 | Chaudhary | G06F 12/0862 711/137 |
| 2014/0344558 A1* | 11/2014 | Holman | G06F 9/3806 712/239 |
| 2015/0026414 A1* | 1/2015 | Kalamatianos | G06F 12/0862 711/137 |
| 2015/0089194 A1* | 3/2015 | Gschwind | G06F 9/30145 712/205 |
| 2015/0106590 A1* | 4/2015 | Chou | G06F 9/30072 712/207 |
| 2015/0121014 A1* | 4/2015 | Dasika | G06F 12/0862 711/137 |
| 2017/0046159 A1* | 2/2017 | Priyadarshi | G06F 9/3804 |
| 2017/0344483 A1* | 11/2017 | Shwartsman | G06F 12/0862 |

OTHER PUBLICATIONS

Kirsch, Adam, and Michael Mitzenmacher. "Less hashing, same performance: building a better bloom filter." European Symposium on Algorithms. Springer, Berlin, Heidelberg, 2006. (Year: 2006).*
Kolli et al., RDIP: Return-address-stack Directed Instruction Prefetching, MICRO'46, ACM, Dec. 7-11, 2013, Davis CA, USA,12 pages.

* cited by examiner

*Primary Examiner* — William B Partridge
(74) *Attorney, Agent, or Firm* — Kowert, Hood, Munyon, Rankin & Goetzel, P.C.

(57) ABSTRACT

A method and system for prefetching instructions is disclosed. A signature may be updated in response to determining that a received instruction initiates a transition in function. A plurality of entries stored in a memory may be searched in response to determining the signature has been updated and a prefetch operation may be initiated in response to determining that the signature matches a given entry of the plurality of entries.

20 Claims, 13 Drawing Sheets

US 10,642,618 B1

CALLGRAPH SIGNATURE PREFETCH

BACKGROUND

Technical Field

Embodiments described herein relate to processors or processor cores, and more particularly, to techniques for fetching instructions.

Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may include a memory system with multiple levels of caches for providing low latency access to program instructions and operands. When a processor is ready for a next instruction or operand, a cache memory may be checked to see if the desired instruction or operand is available in the cache memory. If the desired instruction or operand is available, it is transferred to other circuitry within the processor, such as, e.g., an instruction decoder or execution unit for further processing.

If, however, the desired instruction or operand is not available in the cache memory, a request for the desired information may be sent to a next higher-level cache or system memory. In some cases, further processing may be halted until the desired instruction or operand is retrieved from the higher-level cache or memory.

To minimize an amount of time a processor may be stalled waiting for data to be retrieved from higher-level caches or memories, some processors may employ prefetching. During prefetching, instructions that may be used in coming processing cycles may be fetched from memory and stored in the instruction cache, so that they are available to the processor when they are needed.

SUMMARY OF THE EMBODIMENTS

Various embodiments of a computing system are disclosed. Broadly speaking, a system may include circuitry configured to receive an instruction and update a signature in response to a determination that the instruction initiates a transition between functions or subroutines. The system may further include a memory configured to store a table, which includes a plurality of entries. The circuitry may be further configured to search the plurality of entries in response to a determination that the signature has been updated and determine a candidate prefetch operation in response to a determination that the signature matches a given entry of the plurality of entries. The circuitry may also be configured to initiate the candidate prefetch operation dependent upon a predicted usefulness of the candidate prefetch operation.

In one embodiment, the circuitry may be further configured to update the plurality of entries in response to a detection of a cache miss. In another non-limiting embodiment, the circuitry may be further configured to merge data included in a new entry with data included in an existing entry of the plurality of entries in response to a determination that a first address included in the new entry is adjacent to a second address in the existing entry.

In a further embodiment, the circuitry may be further configured to select a particular entry of the plurality of entries for replacement dependent upon a usefulness associated with the particular entry.

BRIEF DESCRIPTION OF THE DRAWINGS

The following detailed description makes reference to the accompanying drawings, which are now briefly described.

Figure 1:
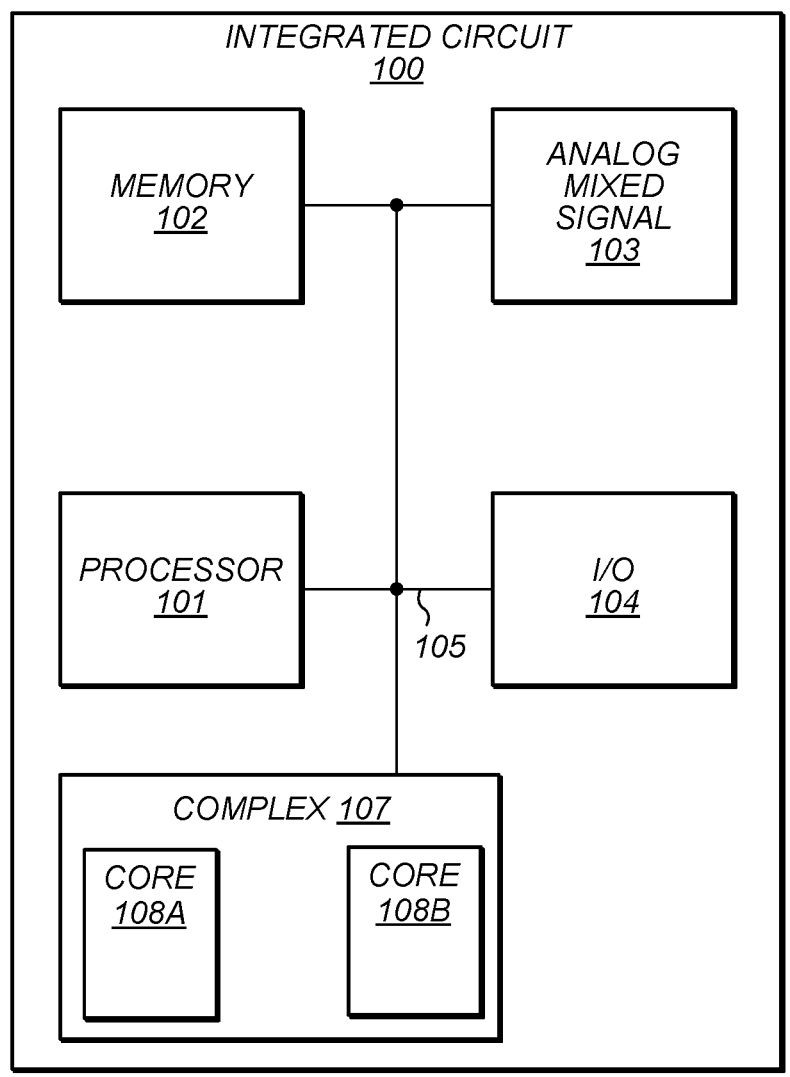
FIG. 1 illustrates an embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Instruction caches may benefit performance in a computing system by reducing an average cost to fetch an instruction by exploiting the temporal and spatial locality commonly seen in program workloads. In workloads with temporal locality, a recently-used instruction is likely to be used again, while in workloads with spatial locality, an instruction located near a recently-used instruction is more likely to be used than an instruction located further away.

When an instruction to be executed is not found in the instruction cache, a miss occurs, and the computing system must request the cache line containing the instruction from the next level of the memory hierarchy and wait until the requested cache line arrives. During this time, further fetching of instructions may be stalled, preventing new instructions from being brought into the processor. Some wide and deep processors may be able to continue to execute older instructions that were in flight prior to the stall, but eventually a lack of new instructions may cause the processor to run out of instructions to execute.

Some processors may execute code speculatively. That is, a path along which instructions are fetched may be directed by a branch prediction system. Not all branches are predicted accurately, so the instruction fetch system may be redirected to fetch from a new predicted path if a previously predicted path is found to be incorrect. Instructions fetched along the incorrect path may be discarded.

Due to speculation, not all fetched instructions are on the true program path and some fetched instructions may be executed at a later time on a different path, and some fetched instructions may never be executed. If a processor allows instruction cache misses from speculative fetches, some of the misses may contain instructions that may never be executed. Some instruction cache misses may bring in instructions that are never executed, while other misses bring in useful instructions and are, therefore, more valuable.

Modern software-development techniques allow for rapid creation of applications using rich libraries accessed through an Application Programmer Interface (API). Such libraries publish functions to implement many common functions, such as, managing user-interface elements, networking and communication, data access, and the like. Functions within a library may call other functions within the same library or a different library. Complex applications, such as, e.g., web browsers, show deep hierarchies of calls to and through software libraries. For example, a single high-level API function call may call many other API functions, which, in turn, call more functions and so forth. An Operating System (OS) kernel may participate by executing code to manage inter-process communication, memory, and allocation of resources between multiple threads and processes.

Instruction caches have limited storage capacity, especially in the fastest level of the cache hierarchy close to the processor. In large applications, the combination of the application program, the software libraries, the OS kernel, and background activity during execution may lead to a large dynamic instruction footprint, which may be larger than an available amount of storage in a cache.

Applications with a large code footprint, such as, e.g., web browsers, may show a high frequency of instruction cache misses, resulting in reduced performance. Such applications may have repetitive behavior, but the limited size of the instruction cache results in a large number of cache misses.

Clearly, one method for improving performance under such workloads would be to increase the size of the instruction cache. Increasing the size of the instruction cache may result in an undesirable increase in chip size, and therefore cost, as well as added power consumption.

Alternatively, prefetching may be applied to load additional instructions into the instruction cache in response to a cache miss. For example, in some cases, an additional number of sequential lines may be fetched following a miss. Such a method may not, however, continuously run ahead of the program flow, as it requires a cache miss to trigger the fetch. The embodiments illustrated in the drawings and described below may provide techniques for predicting a future code path ahead of time and fetching instructions along the future code path before they are required for execution.

To predict such a future code path, a callgraph may be employed. As used and described herein, a callgraph is a directed graph that represents relationships between function calls in an application or program. Each edge of a callgraph may represent a transition from one function (or subroutine) to another function (or subroutine). As execution of an application or program proceeds, different functions may be called, moving through the callgraph. For each transition from one function to another, a number (also referred to herein as a "signature") may be calculated dependent upon a history of previous callgraph transitions. As described below in more detail, changes in the signature may be used to prefetch instructions into the instruction cache.

A block diagram of an integrated circuit including multiple functional units is illustrated in FIG. 1. In the illustrated embodiment, the integrated circuit 100 includes a processor 101, and a processor complex (or simply a "complex") 107 coupled to memory block 102, and analog/mixed-signal block 103, and I/O block 104 through internal bus 105. In various embodiments, integrated circuit 100 may be configured for use in a desktop computer, server, or in a mobile computing application such as, e.g., a tablet or laptop computer.

An embodiment of a computing system that may prefetch instructions along a predicted path is illustrated in FIG. 1. As described below in more detail, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Complex 107 includes processor cores 108A and 108B. Each of processor cores 108A and 108B may be representative of a general-purpose processor configured to execute software instructions in order to perform one or more computational operations. Processor cores 108A and 108B may be designed in accordance with one of various design styles and may include one or more cache memories. In various embodiments, coherency may be maintained across cache memories included in processor cores 108A and 108B. It is noted that although only two processor cores are depicted in complex 107, in other embodiments, any suitable number of processor cores may be employed.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 1, a single memory block is depicted. In other embodiments, any suitable number of memory blocks may be employed.

In some cases, Memory block 102 may store a copy of data also stored in cache memories included in processor cores 108A and 108B. In various embodiments, multiple copies of particular data items may be maintained according to a coherency protocol such as, MOESI, for example. Coherent requests and corresponding responses (collectively "transactions" may be transmitted via bus 105). In other embodiments, additional busses connecting different circuit blocks may be employed. Such additional busses may only support non-coherent commands.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with wireless networks.

I/O block 104 may be configured to coordinate data transfer between integrated circuit 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between integrated circuit 100 and one or more devices (e.g., other computer systems or integrated circuits) coupled to integrated circuit 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the embodiment illustrated in FIG. 1 is merely an example. In other embodiments, different functional units, and different arrangements of functional units may be employed.

Figure 2:
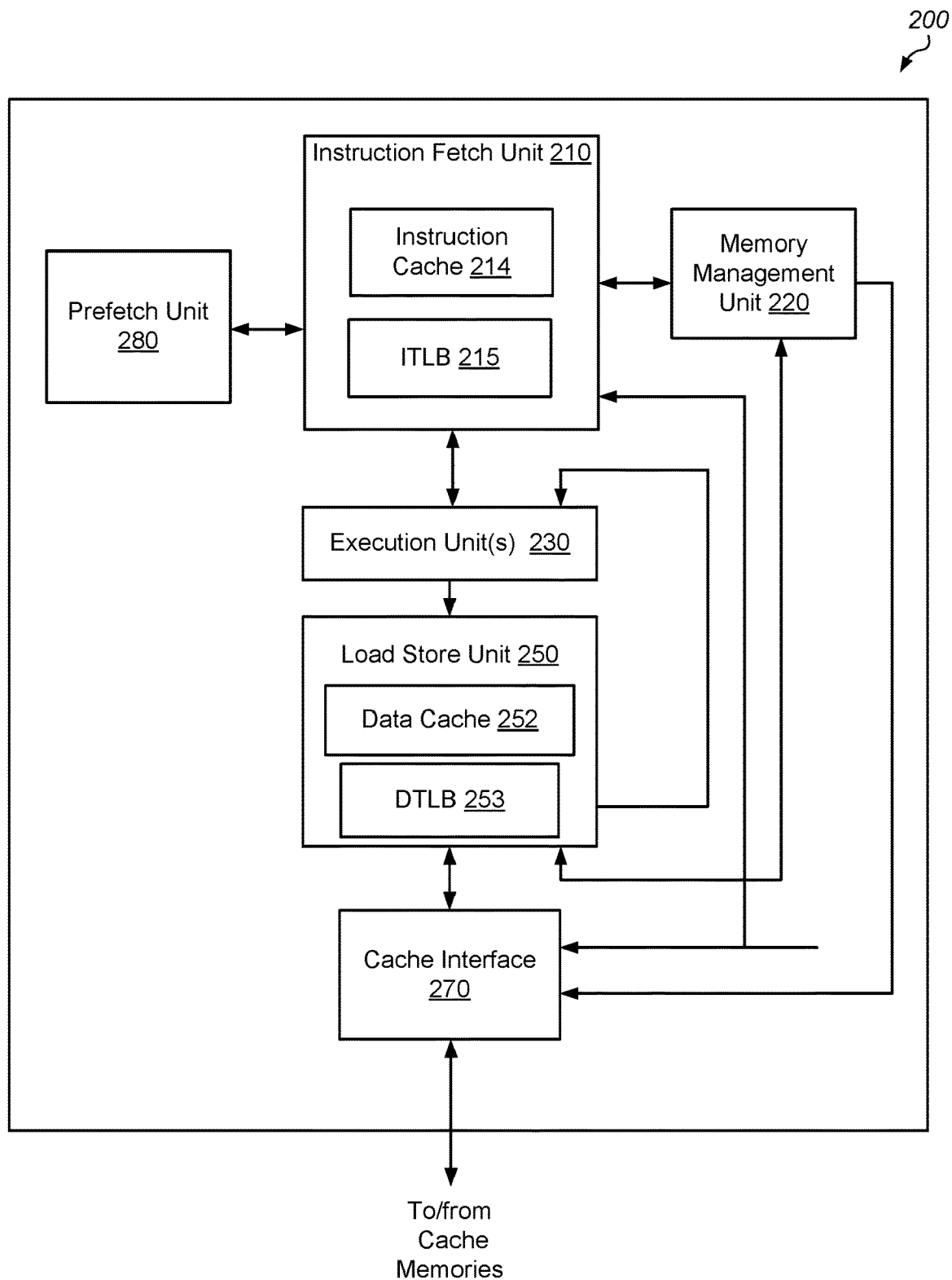
FIG. 2 illustrates a block diagram of an embodiment of a processor core.

A possible embodiment of a cores 108a-b is illustrated in FIG. 2. In the illustrated embodiment, core 200 includes an Instruction Fetch Unit (IFU) 210 coupled to a Memory Management Unit (MMU) 220, a Cache Interface 270, Prefetch Unit 280, and one or more of Execution Units 230.

Execution unit(s) 230 is coupled to Load Store Unit (LSU) 250, which is also coupled to send data back to each of execution unit(s) 230. Additionally, LSU 250 is coupled to cache interface 270, which may in turn be coupled to on-chip network, such as internal bus 105 as shown in FIG. 1, for example.

Instruction Fetch Unit 210 may be configured to provide instructions to the rest of core 200 for execution. In the illustrated embodiment, IFU 210 may be configured to perform various operations relating to the fetching of instructions from cache or memory, the selection of instructions from various threads for execution, and the decoding of such instructions prior to issuing the instructions to various functional units for execution. Instruction Fetch Unit 210 further includes an Instruction Cache 214. In one embodiment, IFU 210 may include logic to maintain fetch addresses (e.g., derived from program counters) corresponding to each thread being executed by core 200, and to coordinate the retrieval of instructions from Instruction Cache 214 according to those fetch addresses. Additionally, in some embodiments IFU 210 may include a portion of a map of virtual instruction addresses to physical addresses. The portion of the map may be stored in an Instruction Translation Lookaside Buffer (ITLB), such as ITLB 215, for example. In some embodiments, IFU 210 may prefetch some instructions based on data received from Prefetch Unit 280. In one embodiment, IFU 210 may include a miss queue configured to store records of pending memory accesses that have missed in Instruction Cache 214 such that additional memory accesses targeting memory addresses for which a miss is pending may not generate additional cache request traffic.

Prefetch Unit 280 is coupled to IFU 210 and may be configured to determine instructions to fetch into Instruction Cache 210 in the event of a cache miss. As described below in more detail, Prefetch Unit 280 may determine which instructions to fetch based on a callgraph signature of instructions which have been fetched, executed, and retired. In some embodiments, Prefetch Unit 280 may include memory to store a table that includes a history of callgraph signatures. Additionally, Prefetch Unit 280 may track the usefulness of entries in the table, i.e., were the prefetched instructions used or discarded, and add or remove entries in the table based on the usefulness indication.

Execution Unit 230 may be configured to execute and provide results for certain types of instructions issued from IFU 210. In one embodiment, Execution Unit 230 may be configured to execute certain integer-type and floating-point instructions defined in the implemented ISA, such as arithmetic, logical, and shift instructions. It is contemplated that in some embodiments, core 200 may include more than one execution unit, and each of the execution units may or may not be symmetric in functionality.

Load Store Unit 250 may be configured to process data memory references, such as integer and floating-point load and store instructions. In some embodiments, LSU 250 may also be configured to assist in the processing of Instruction Cache 214 misses originating from IFU 210. LSU 250 includes Data Cache 252 as well as logic configured to detect cache misses and to responsively request data from a particular cache memory via Cache Interface 270. In one embodiment, Data Cache 252 may be configured as a write-through cache in which all stores are written to a particular cache memory regardless of whether they hit in Data Cache 252. In other embodiments, Data Cache 252 may be implemented as a write-back cache.

In one embodiment, LSU 250 may include a miss queue configured to store records of pending memory accesses that have missed in Data Cache 252 such that additional memory accesses targeting memory addresses for which a miss is pending may not generate additional cache request traffic. In the illustrated embodiment, address generation for a load/store instruction may be performed by one of Execution Unit(s) 230. Depending on the addressing mode specified by the instruction, one of Execution Unit(s) 230 may perform arithmetic (such as adding an index value to a base value, for example) to yield the desired address. Additionally, in some embodiments LSU 250 may include logic configured to translate virtual data addresses generated by Execution Unit(s) 230 to physical addresses. For example, in the present embodiment, LSU 250 includes a Data Translation Lookaside Buffer (DTLB) 253.

It is noted that the embodiment illustrated in FIG. 2 is merely an example and that some circuit blocks have been omitted for clarity. In other embodiments, different numbers of circuit blocks and different arrangements of circuit blocks may be employed.

Figure 3:
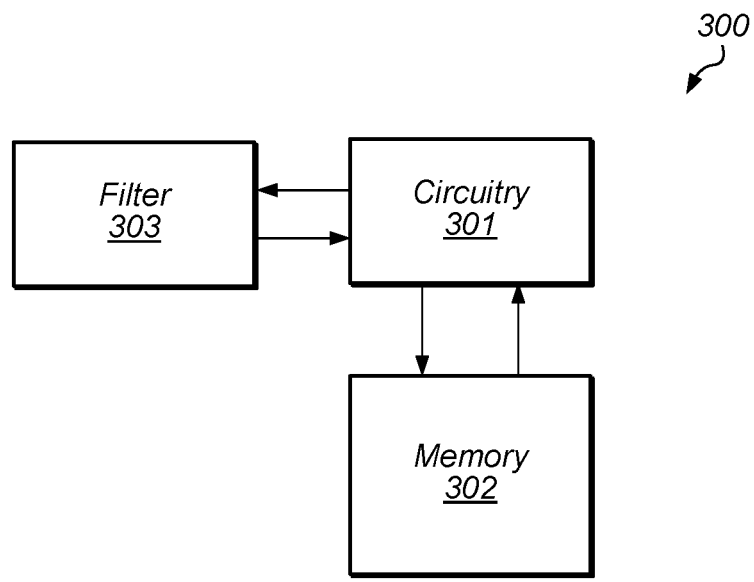
FIG. 3 illustrates a block diagram depicting an embodiment of a prefetch unit.

Turning to FIG. 3, an embodiment of a prefetch unit is illustrated. In the illustrated embodiment, prefetch unit 300 may correspond to Prefetch Unit 280 as depicted in the embodiment illustrated in FIG. 2. Prefetch unit 300 includes Circuitry 301 coupled to both Memory 302 and Filter 303.

Circuitry 301 may be configured to update a callgraph signature based on transitions within a program callgraph. In some embodiments, the transitions in the program callgraph may correspond to call and return instructions. Each time the callgraph signature changes, Circuitry 301 may search a table stored in Memory 302 for entries with a matching signature. If a matching signature is found in an entry in the table, Circuitry 301 may trigger a prefetch operation to be performed by an Instruction Fetch Unit, such as, e.g., IFU 210 as illustrated in FIG. 2, dependent upon cache line addresses corresponding to the current callgraph signature.

When updating the callgraph signature, Circuitry 301 may employ different techniques. For example, as shown in Code Example 1, Circuitry 301 may update the callgraph by performing a shift and exclusive-OR (XOR) operation of recent call or return instruction target addresses.

Code Example 1

```
if(instruction_is_taken_call_or_return) {
callgraph_history=(callgraph_history<<shift_value)^
  instruction_branch_target;
}
```

Alternatively, as depicted in Code Example 2, Circuitry 301 may update the callgraph signature by performing a shift or XOR operation on a recent branch instruction target addresses, sampled at each call or return function.

Code Example 2

```
if(instruction_is_taken_call_or_return) {
callgraph_history=branch_history;
}
if (instruction_is_taken_branch) {
branch_history=(branch_history<<shift_value)^
  branch_target;
}
```

In other embodiments, Circuitry 301 may employ shift and XOR operations on a history of recent call or return program counter addresses, as depicted in Code Example 3. In various other embodiments, Circuitry 301 may employ the target address of call or return functions, or the program counter address of call or return functions to updated the callgraph signature. Alternatively, Circuitry 301 may perform shift and XOR operations on N recent call-return target addresses (with and without folding), perform shift and XOR operations on N recent call-return program counter addresses (with and without folding), or use the top N values from the call/return stack combined with last transaction bit to update the callgraph signature. It is noted that in the above description, N is a positive integer.

Code Example 3

```
if(instruction_is_call_or_return( )) {
new_history=(last_history<<shift_value)^ instruction_pc;
}
```

As described below in more detail, Memory 302 may be configured to store a table, which includes multiple entries. Each entry may include data indicative of a previously determined callgraph signature. In various embodiments, entries may be added based on a replacement policy. For example, new entries may be added at least recently used positions. Moreover, Circuitry 301 may track usefulness of the entries included in the table and use such information to determine entries to remove from the table.

Filter 303 may, in various embodiments, include a Bloom Filter which may be checked by Circuitry 301 before performing a lookup in the table stored in Memory 302. If a match is detected upon checking Filter 303, the lookup may be aborted. Additionally, upon the completion of each lookup performed, Circuitry 301 may add a callgraph signature used for the lookup to Filter 303. In some embodiments, Filter 303 may be reset when the instruction cache changes. By using Filter 303 in this fashion, repeated lookups of the same signature may be suppressed until a change in the instruction cache or prediction table has occurred.

It is noted that the embodiment illustrated in FIG. 3 is merely an example. In other embodiments, different circuit blocks and different configurations of circuit blocks may be employed.

Figure 4:
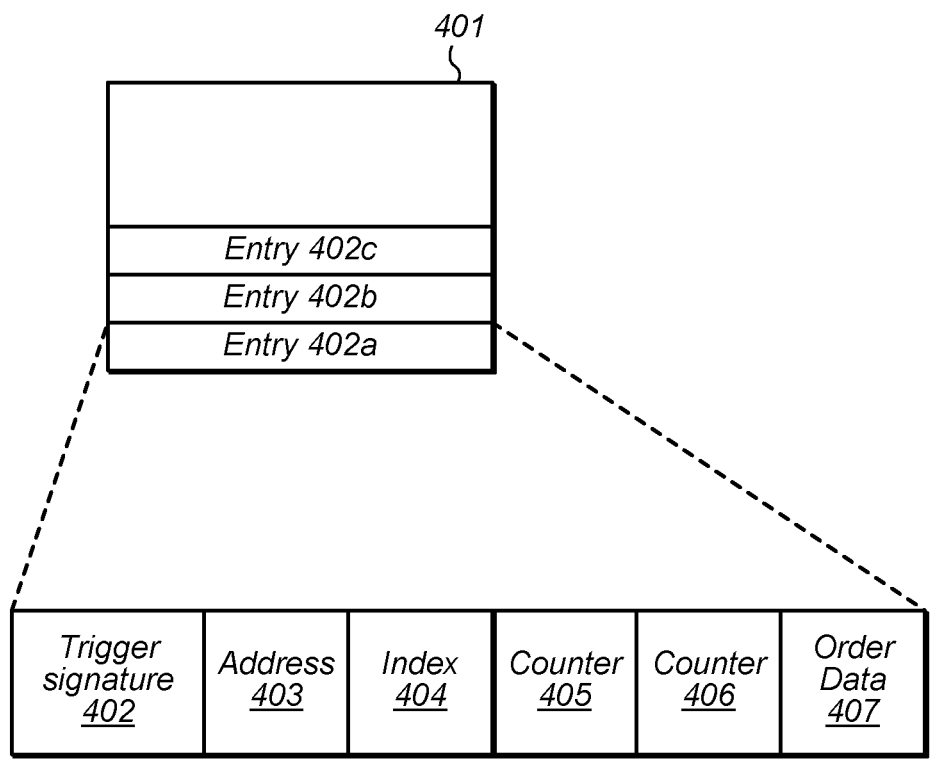
FIG. 4 illustrates a block diagram depicting an embodiment of a prefetch table.

An embodiment of a prefetch table data structure is illustrated in FIG. 4. Prefetch table 401 may, in various embodiments, be stored in a memory included in a prefetch unit, such as Memory 302 as illustrated in FIG. 3. In the illustrated embodiment, prefetch table 401 includes entries 402a through 402c. It is noted that although only three entries are depicted in the embodiment illustrated in FIG. 4, in other embodiments, any suitable number of entries may be employed.

Each one of entries 402a through 402c may include multiple fields. Each field may include multiple data bits, which may encode various types of information. For example, an entry may include Trigger signature 402. In various embodiments, Trigger signature 402 may include data indicative of a callgraph signature at a time, or a time slightly before, a transition between functions previously occurred in the execution of a program. When the current callgraph signature changes, it may be checked against a trigger signature of entries included in prefetch table 401 to determine if there is a match. It is noted that, in various embodiments, prefetch table 401 may be set-associative, so only a portion of the signature may be used to compare against a tag, thereby eliminating the need to store the an entire signature.

Each of entries 402a through 402c may also include Address 403 and Index 404. In some embodiments, Address 403 may correspond to a primary line associated with the signature stored in Trigger signature 403. In other embodiments, values of counters 405 and 406 may be used to indicate whether the primary line and lines offset from the primary line are to be prefetched. For example, counter value 405 may be used to indicate that the primary line should be prefetched, and counter 406 may be used to indicate that a line should be prefetched from an address equal to the address value of the primary line plus the line length. It is noted that although only two counters covering adjacent line address entries are depicted, in other embodiments, any suitable number of counters may be employed.

In some embodiments, Address 403 may include lower-order bits of an instruction cache line address. In such cases, Index 404 may include data for accessing a secondary table, which may contain high-order bits of the instruction cache line address.

As described below in more detail, information indicating the usefulness of the various entries in prefetch table 401, such as, e.g., entry 402a, may be fed back to prefetch table 401. This feedback may take the form of incrementing or decrementing Counters 405 and 406. In some cases, each of Counters 405 and 406 may correspond a primary line and an adjacent line, respectively, associated with a value of Trigger signature 402.

An order for entries, such as entry 402a, included in prefetch table 401 may be maintained. Each entry may include order data that is indicative of the entry's relative order compared to the other entries. For example, field Order Data 407 may include one or more data bits encoded the order of the particular entry. When a particular entry is used, Order Data 407 may be incremented, thereby changing its order relative to other entries. As described below, in more detail, Order Data 407 may be employed to determine a least recently used entry to be replaced when it is determined that a new entry is to be added to be prefetch table 401.

It is noted that embodiment illustrated in FIG. 4 is merely an example. In other embodiments, different fields may be included in the entries of prefetch table 401.

Figure 5:
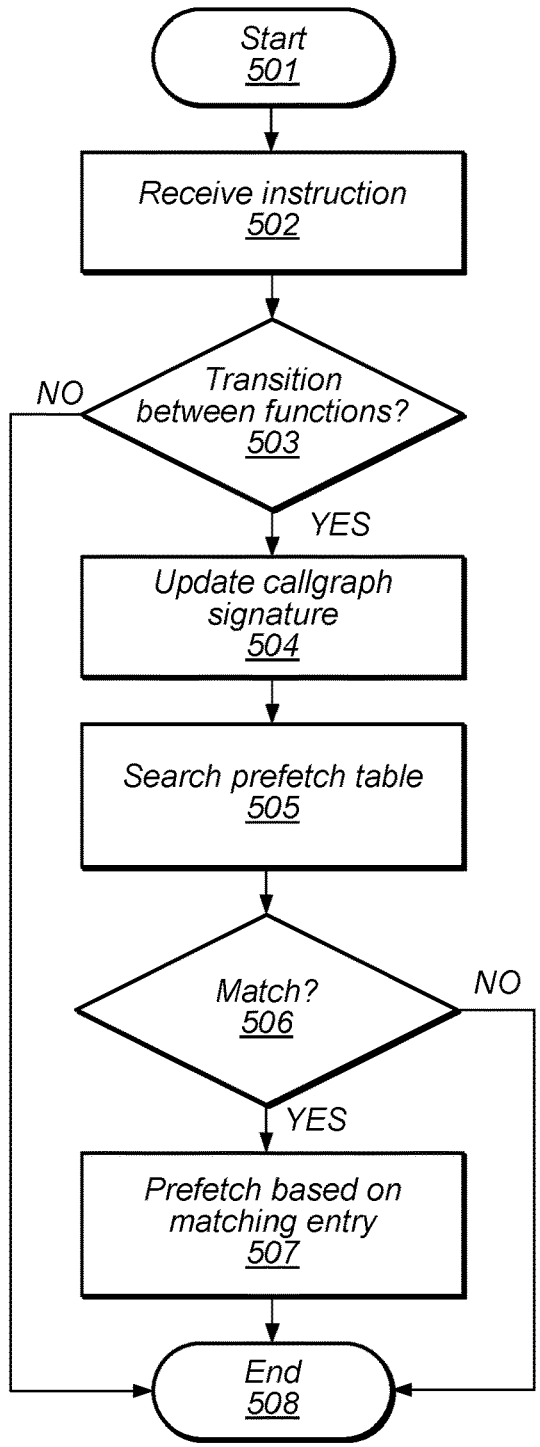
FIG. 5 illustrates a flow diagram depicting an embodiment of a method for prefetching instructions.

Turning to FIG. 5, a flow diagram depicting an embodiment of a method for prefetching instructions based on a callgraph signature is illustrated. Referring collectively to the embodiment of FIG. 2 and the flow diagram of FIG. 5, the method begins in block 501. Prefetch Unit 280 may then receive an instruction (block 502). In various embodiments, the instruction may be received from IFU 210. The method may then depend on if there is a function change (block 503).

If there is no change in function resulting from the received instruction, the method may conclude in block 508. Alternatively, if the received instruction results in a function change (for example, if the received instruction is a call or return), then the callgraph signature may be updated (block 504). As described above in more detail, the callgraph signature may be updated according to one of various methods.

Once the callgraph signature has been updated, a prefetch table, such as, prefetch table 401 as illustrated in FIG. 4, may be searched (block 505). In various embodiments, the callgraph signature may be checked against a trigger signature, such as, e.g., Trigger signature 403 as depicted in FIG. 4, for each entry in the prefetch table. The method may then depend on if a match is found between the callgraph signature and one of the trigger signatures in the entries of the prefetch table (block 506).

If no match was found amongst the entries in the prefetch table, the method may conclude in block 508. Alternatively, if a match is found, then a prefetch operation may be initiated based on the matching entry (block 507). In various embodiments, a prefetch unit, such as, e.g., prefetch unit 280 as illustrated in the embodiment of FIG. 2, may send address information corresponding to one or more lines to fetch into an instruction cache to an Instruction Fetch Unit. The Instruction Fetch Unit may fetch the desired cache lines from a next higher-level cache memory or system memory. Once the prefetch operation has been initiated, the method may conclude in block 508.

Although the operations included in the flow diagram of FIG. 5 are depicted as being performed in a sequential fashion, it is noted that, in other embodiments, some of the operations may be performed in parallel.

In a processor or processor core that employs branch prediction and speculative instruction fetching, instruction cache misses may be a result of fetching instructions down a predicted program path that is subsequently aborted due to a branch prediction. Many processors and processor cores can contain instructions from only one predicted path. As a result, when an instruction cache miss occurs, a halt in execution may result. When such a instruction cache miss occurs, an error in the predicted program path may be detected and corrected, allowing instructions from the old path to be discarded and instruction fetching to be redirected down a new program path. A previously issued cache miss should not block instruction fetch if the new path does not require the contents of the previously issued cache miss.

When a high value instruction cache miss is identified, i.e., that is a miss that results in delays in instruction fetching, the address of the miss along with a signature that was current a short time before this miss occurred may be stored in a prefetch table, such as, prefetch table 400 as illustrated in the embodiment of FIG. 4, for example. By storing a signature that was current before the miss actually occurred, a prefetch may be issued and the results returned before the program reaches the position in the callgraph where the instructions are actually required. High-value cache misses may, in some cases, also coincide with a performance optimization known as "fill forward" in which arriving data is forwarded directly to the fetch unit at or before the time that the data is written into the instruction cache.

High-value cache misses may also be identified by using only misses originating from demand-fetch requests which exclude next-line prefetches, using only misses that were ever a demand-fetch including next-line prefetches upgraded to demand fetches, using only misses that were consumed by fetch after being filled into the cache, and using only misses where in the round-trip time from miss detection to line fill is greater than a predetermined threshold.

The signature that was current a short time before the miss occurred is referred to herein as a "training signature." A training signature may be formed from a delayed version of a current signature. The delay may be determined using a number of cycles. Alternatively, a number of callgraph transitions may be counted. The delay between a current signature and a training signature should be greater than the time required to fetch a line into the instruction cache (commonly referred to as a "prefetch lead time").

The training signature may be determined in various ways. For example, in one embodiment, the training signature may be determined based upon retiring call/return instructions. The time difference between instruction fetch and retirement provides some delay for the prefetch lead time. By using retired instructions, entries are added to the prefetch table based on call/return signature present on a true path of program execution. Additional lead time may be obtained by inserting delays to the signature calculated at retirement. For example, instead of using the last retired call/return signature, the second-to-last, or third-to-last retired call/return signature may be used.

Alternatively, a signature may be delayed by a fixed number of transitions, such as, e.g., 5 call/return transitions and corrected on fetch requests. In other embodiments, a signature may be delayed by a fixed number of cycles, or the signature may be computed from a call/return stack, i.e., the return-address stack) delayed by a number of transitions.

Figure 6:
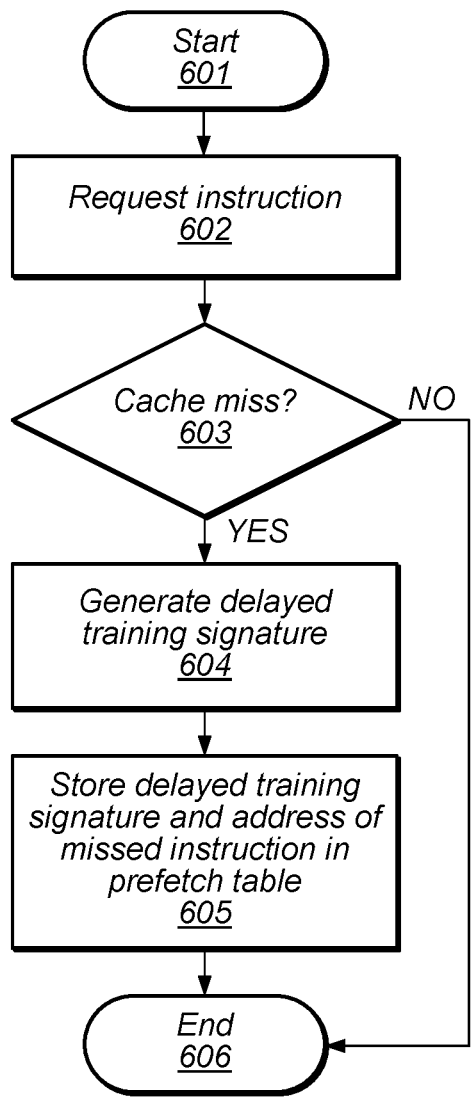
FIG. 6 illustrates a flow diagram depicting an embodiment of a method for training a prefetch table.

An embodiment of a method for how training is employed is depicted in the flow diagram illustrated in FIG. 6. The method begins in block 601. An instruction may then be requested (block 602). In various embodiments, the instruction may be requested by an Instruction Fetch Unit, such as IFU 210 as illustrated in the embodiment of FIG. 2. The method may then depend on whether the requested instruction is stored in a cache memory.

If the requested instruction is stored in the cache, the method may conclude in block 606. Alternatively, if the requested instruction is not stored in the cache memory, then a delayed training signature is generated (block 604). When a cache miss is identified, the address corresponding to the miss and a corresponding signature need to be stored in the prefetch table. As described above a training signature may be formed from a delayed version of a current signature.

Once the training signature has been generated, the address of the miss and the delayed training signature may be added to an entry in the prefetch table (block 605). As described below in regard to FIG. 7, the new information may, in some cases, be merged into an existing entry. Alternatively, the new information may be added into the prefetch table according to a replacement policy.

In various embodiments, the replacement policy for the prefetch table may be crafted to maintain entries corresponding to successful prefetches, while unhelpful or obsolete entries are removed. In various embodiments, the replacement policy may be implemented using a Least Recently Used (LRU) policy. New entries may be inserted at the LRU position. As such, new entries may be most likely to be replaced if they are not used.

Once the new information has been added to the prefetch table, the method may conclude in block 606. It is noted that the embodiment of the method illustrated in the flow diagram of FIG. 6 is merely an example. In other embodiments, different operations and different orders of operations are possible and contemplated.

During operation, as entries may be promoted towards the Most-Recently-Used (MRU) position dependent upon one of the confidence counters associated with a particular entry being incremented. Each time an entry is used for a successful prefetch, its corresponding confidence counter may be incremented, and the entire entry marked as MRU. In various embodiments, recently added entries will be maintained in the prefetch table once their usefulness, i.e., generating successful prefetches, is established.

In some cases, when a trigger condition is satisfied and an entry is scheduled for insertion in the prefetch table, other table entries may be checked in order to determine if the miss address may be added as adjacent line to already existing entry with the same signature. By merging entries in this fashion, a single entry in the prefetch table may be able to prefetch multiple cache lines.

Figure 7:
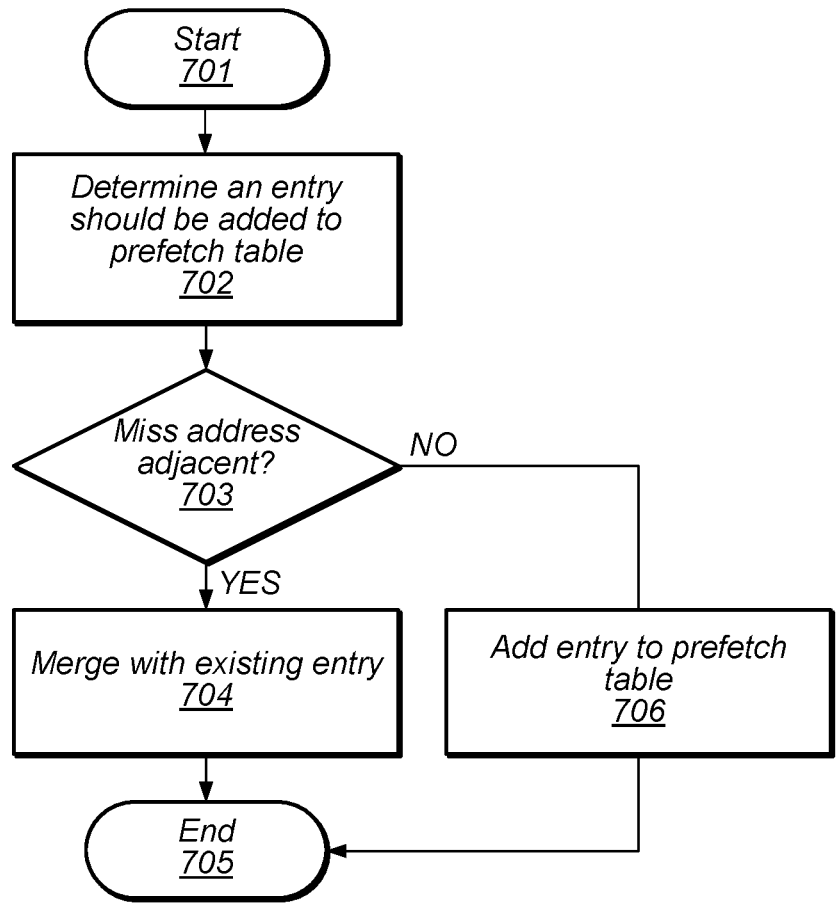
FIG. 7 illustrates a flow diagram depicting an embodiment of a method for merging a new entry into an existing entry in a prefetch table.

Turning to FIG. 7, an embodiment of a method for merging entries in a prefetch table is depicted in illustrated flow diagram. The method begins in block 701. A determination may then be made if an entry should be added to the prefetch table, such as, prefetch table 400 as illustrated in FIG. 4, for example (block 702). In some embodiments, it may be determined that a new entry should be added to the prefetch table in response to a cache miss. The method may then depend on a value of a miss address (block 703).

If the address of the cache miss is not adjacent to an address of any entries with the same signature previously stored in the prefetch table, then a new entry is added to the prefetch table (block 706). In some embodiments, the new entry may be added according to a replacement policy for the prefetch table as described above in more detail. Once the new entry has been added, the method may conclude in block 705.

Alternatively, if the address of the cache miss is adjacent to an address included in a particular entry of the prefetch table that has the same signature, the new entry is merged with the existing particular entry (block 704). By merging the new entry with the existing entry, when the signature is encountered again, multiple lines may be fetched, possibly improving performance by having more of the needed data stored in the cache memory. Once the new entry has been merged with the existing entry, the method may conclude in block 705.

It is noted that the embodiment of the method illustrated in FIG. 7 is merely an example. In other embodiments, different operations and different arrangements of operations may be employed.

Figure 8:
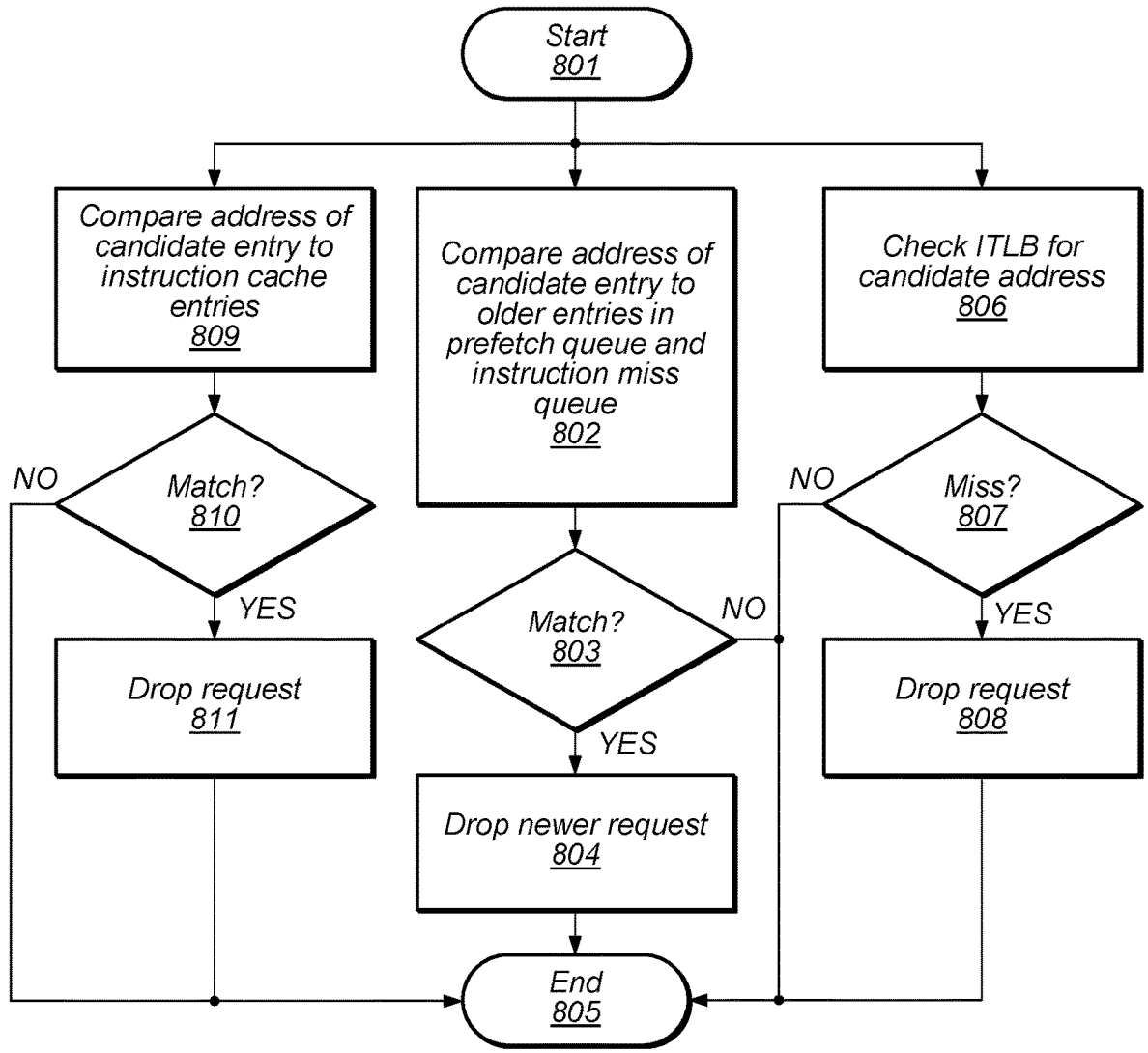
FIG. 8 illustrates a flow diagram depicting an embodiment of a method implementing a policy to qualify prefetch candidates.

When a table lookup (or table search) is performed, one or more matching entries may become candidates for prefetching. In order to minimize unnecessary memory traffic, a number of checks may be applied to candidate prefetches before they are sent to the next level of the cache hierarchy. A flow diagram depicting an embodiment of a method for checking prefetch candidates is illustrated in FIG. 8. The method may begin in block 801.

The address of the candidate entry may be compared to older entries in the prefetch and instruction miss queues (block 802). The method may then depend if a match is found (block 803). If no match is found, then the method may conclude in block 805.

Alternatively, if the address included in the candidate entry matches one of the entries already in the prefetch queue or instruction cache miss queue, then the newer prefetch request is dropped (block 804) since a request for that address is already in progress. The method may then conclude in block 805.

Alternatively, or additionally, the address of a candidate entry is translated using an ITLB, such as, ITLB 215 as illustrated in FIG. 2, for example (block 806). The method may then depend on if the address of the candidate entry is found in the ITLB (block 807). If a match is found in the ITLB, then the method may conclude in block 805. If, however, the address of the candidate entry is not found in the ITLB, then the prefetch request is dropped (block 808). The method may then conclude in block 805.

In some cases, the address of a candidate entry may be compared to entries in an instruction cache, such as, Instruction Cache 214, for example (block 809). The method may then depend on the address of the candidate entry is found in one of the entries in the instruction cache (block 810).

If the address of the candidate entry is not present in any of the entries in the instruction cache, then the method may conclude in block 805. If, however, the address of the candidate entry is found in one of the entries in the instruction cache, then the request is dropped as that address is already present in the instruction cache (block 811). The method may then conclude in block 805.

It is noted that the embodiment depicted in FIG. 8 includes multiple checks. In other embodiments, a single check may be employed, or additional checks not illustrated may be employed.

Most program workloads include function calls and returns, thereby triggering callgraph transitions. As described above, each change in the callgraph signature results in a prefetch table lookup. Repeated lookups may result from a workload that repeats the same sequence of function calls and returns, even if there were no cache misses and each instruction was already stored in the instruction cache.

In order to prevent such repeated lookups in the prefetch table, a Bloom filter may be employed. An embodiment of a method filtering lookups to the prefetch table using a Bloom filter is illustrated in the flow diagram depicted in FIG. 9. Referring collectively to FIG. 3 and the flow diagram of FIG. 9, the method begins in block 901.

Circuitry 301 may then check the current callgraph signature (block 902). In various embodiments, the current callgraph signature is updated in response to a change in function as described above in regard to FIG. 5. If the current callgraph signature indicates a change of function, the contents of Bloom filter 303 may then be examined (block 903). As described above, Bloom filter 303 may include multiple entries corresponding to signatures recently used in a lookup to the prefetch table. The method may then depend on the results of examining Bloom filter 303.

If the current callgraph signature is found to correspond to an entry in the Bloom filter, then the current lookup may be aborted (block 905). By aborting the lookup, repeated lookups in cases when the instruction cache has not changed may be avoided thereby saving power associated with the lookup process. Once the lookup has been aborted, the method may conclude in block 906.

Alternatively, if the current callgraph signature is not found in the bloom filter, then a lookup of the prefetch table is performed (block 907). Since the callgraph signature was not found in Bloom filter 303, the change in the callgraph signature may not be the result of a repeated sequence of function calls and returns. As such, the current callgraph signature may then be added to Bloom filter 303 (block 908). With the addition of the current callgraph signature to Bloom filter 303, the method may conclude in block 906.

Figure 9:
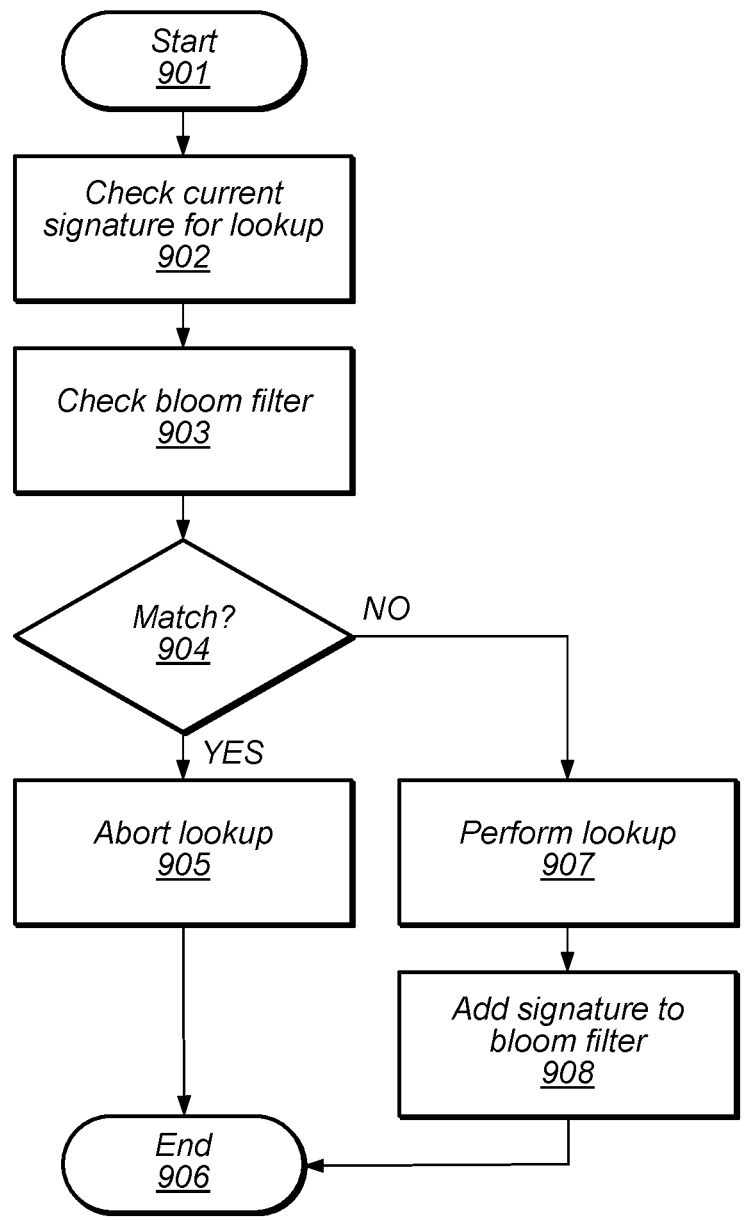
FIG. 9 illustrates a flow diagram depicting an embodiment of a method for filtering lookups in a prefetch table.

It is noted that the embodiment of the method depicted in the flow diagram of FIG. 9 is merely an example. In other embodiments, different operations and different orders of operations may be employed.

When the contents of the instruction cache change, it may no longer be desirable to suppress repeated lookups in the prefetch table. When this occurs, Bloom filter 303 may be reset to allow previously repeated lookups to be performed. A flow diagram depicting an embodiment of a method for resetting a Bloom filter is illustrated. The method begins in block 1001.

A number of writes committed to an instruction cache, such as, e.g., Instruction Cache 214 as depicted in FIG. 2, may then be checked (block 1002). The method may then depend on the determined number of writes committed to the instruction cache (block 1003).

If the number of writes committed to the instruction cache is less than a threshold value, then the method may conclude in block 1005. Alternatively, if the number of writes committed to the instruction cache is greater than or equal to the threshold value, the Bloom filter, such as, e.g., Bloom filter 303 may be reset (block 1004). In various embodiments, initializing all of the contents to zero or other suitable known values may reset Bloom filter 303. Once Bloom filter 303 is reset, the method may conclude in block 1005.

Figure 10:
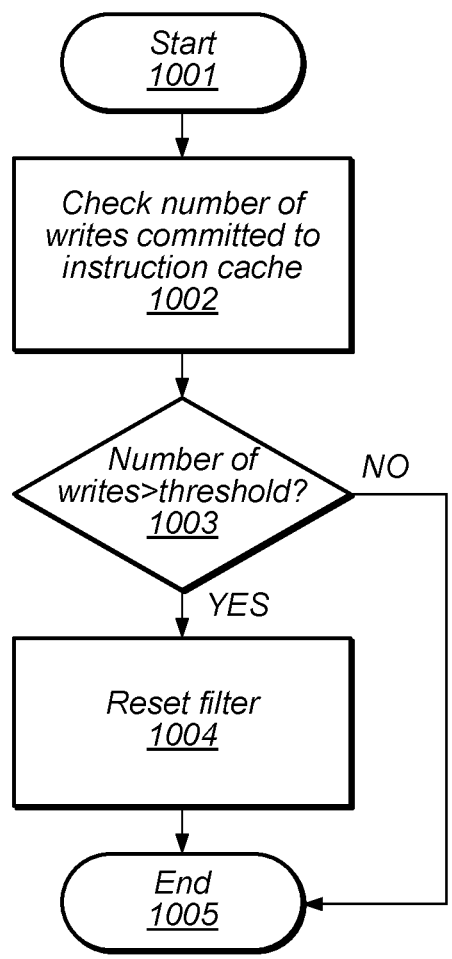
FIG. 10 illustrates a flow diagram depicting an embodiment of a method for resetting a Bloom filter used for filtering lookups in a prefetch table.

It is noted that the embodiment of the method depicted in the flow diagram of FIG. 10 is merely an example. In other embodiments, different operations and different orders or operations are possible and contemplated.

Not all prefetches made using data from a prefetch table, such as, e.g., prefetch table 401 as illustrated in FIG. 4, will be useful. It is desirable only to maintain entries in the prefetch table that are useful. To accomplish this, a feedback mechanism may be employed that updates information in entries of the prefetch table so that entries that are determined to be not useful do not generate prefetches and may be removed. As part of the feedback process, cache lines fetched using an entry from the prefetch table may be annotated with additional information. An embodiment of a method for annotating cache lines is depicted in the flow diagram illustrated in FIG. 11.

The method begins in block 1101. A lookup in the prefetch table may then be performed (block 1102). As described above, during the lookup process, the updated signature may be compared to signature information stored within each entry in the prefetch table. The method may then depend on whether a match is found in the prefetch table (block 1103).

If there is no match, then the method may conclude in block 1106. If however, there is a match, the lines with non-zero confidence counter values are fetched (block 1104). A given entry in the prefetch table may cover a primary address as well as a number of adjacent lines. In some embodiments, a separate confidence counter is employed for each line associated with the given entry, such as counter 405, for example. In various embodiments, a prefetch may be initiated for each line, whose corresponding confidence counter value is non-zero, associated with the given cache entry. It is noted that, in some embodiments, the confidence counter value for a primary line associated with a particular prefetch table entry may be set to a maximum value upon insertion to the table. Confidence counter values for non-primary lines may be set a minimum non-zero value.

Once the line, or lines, are prefetched and stored in the cache, the prefetched lines may be annotated with information regarding the prefetch table entry whose data was used to fetch the lines (block 1105). In some embodiments, additional circuitry in an instruction cache, such as, e.g., Instruction Cache 214 as illustrated in FIG. 2, may store a prefetch-valid indicator and a location of an entry in the prefetch table from which resulted in the a particular line being prefetched. Once the prefetched lines have been annotated, the method may conclude in block 1106.

Figure 11:
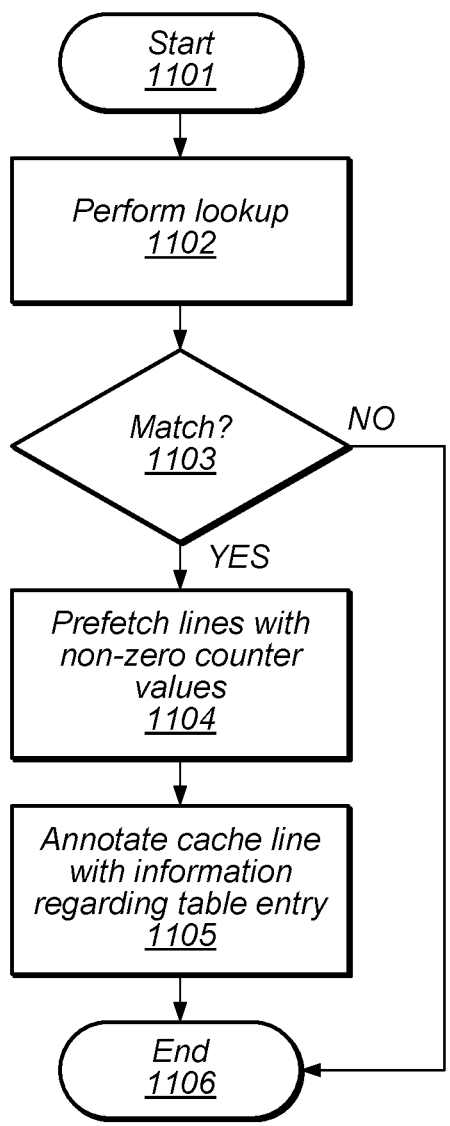
FIG. 11 illustrates a flow diagram depicting an embodiment of a method for annotating cache lines based on a prefetch table.

It is noted that the embodiment depicted in the flow diagram of FIG. 11 is merely an example. In other embodiments, different methods may be employed to annotate cache lines.

Figure 12:
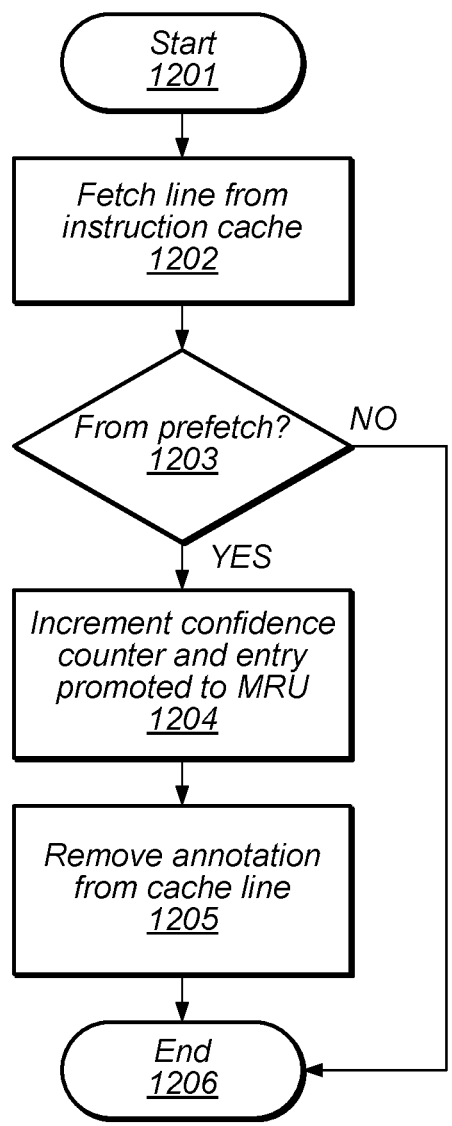
FIG. 12 illustrates a flow diagram depicting an embodiment of a method for updating entries in a prefetch table during an instruction fetch.

Once a line has been prefetched and stored in the instruction cache, it may be fetched from the instruction cache to be used in an execution unit. When this occurs, the fact that the prefetched line was actually used may be fed back to the prefetch unit to indicate the usefulness of an entry in the prefetch table corresponding to the prefetched lines. An embodiment of a method for providing feedback to the prefetch unit is depicted in the flow diagram illustrated in FIG. 12. The method may begin in block 1201.

A line stored in the instruction cache may be fetched from the instruction cache (block 1202). In various embodiments, the line may be fetched in response to a determination that the line is needed in the execution of a current execution thread. The method may then depend on if the line fetched from the instruction cache was loaded into the instruction cache as a result of a prefetch (block 1203).

If the line was not loaded into the instruction cache as part of a prefetch operation, then the method may conclude in block 1206. Alternatively, if the line was stored in the instruction cache as the result of a prefetch, then a confidence counter included in the prefetch table entry associated with the line may be incremented and the table entry promoted to MRU (block 1204). In various embodiments, a value of the confidence counter may be incremented up to a maximum value.

Once the confidence counter has been incremented, the annotation associated with the line may be removed (block 1205). By removing the annotation for the line, the feedback to the prefetch table is limited to only the first successful fetch of the line, thereby saving overhead associated with incrementing the confidence counters. Once the annotation has been removed from the line, the method may conclude in block 1206.

Figure 13:
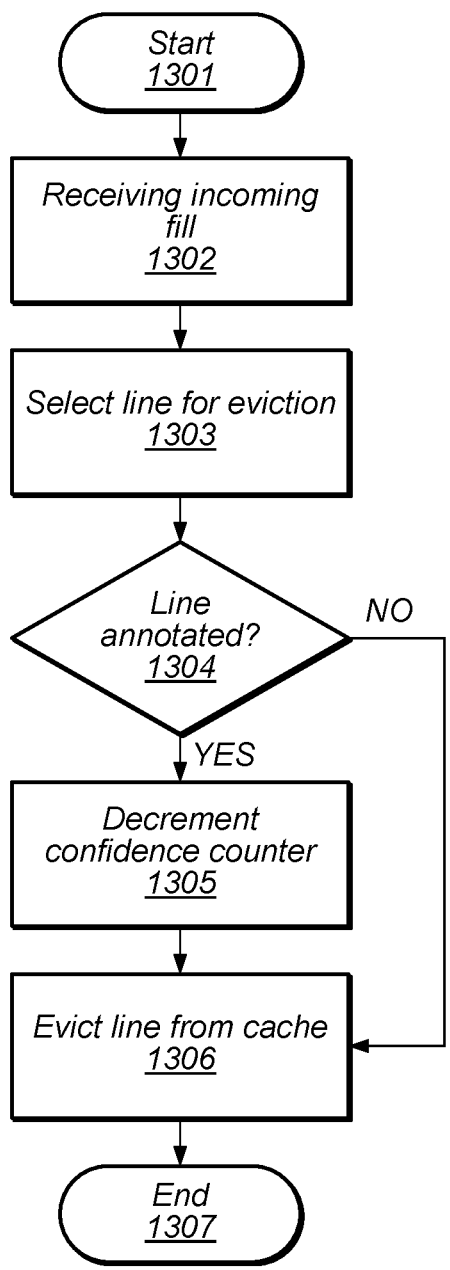
FIG. 13 illustrates a flow diagram depicting an embodiment of a method for updating entries in a prefetch table during an eviction from a cache.

When new instruction data is fetched from memory and stored in the instruction cache, existing cache lines must be removed to make room for the new data. This process is commonly referred to as "eviction." When a line stored in a cache is evicted and that line was loaded into the cache as a result of a prefetch, that prefetch may be considered not useful. The flow diagram illustrated in FIG. 13 depicts an embodiment of a method for feeding back eviction information to the prefetch unit. The method may begin in block 1301. An instruction cache, such as, e.g., Instruction Cache 214 as illustrated in FIG. 2, may receive incoming fill data (block 1302). The incoming fill data may be the result of a previous instruction cache miss, or may be data resulting from a previous prefetch operation.

A particular line or lines may be selected for eviction (block 1303). In various embodiments, the lines selected for eviction from the cache may be determined based on how recently the lines have been accessed, or any other suitable metric. The method may then depend on if the line or lines selected for eviction are annotated (block 1304).

As described above, a line stored in the instruction cache may be annotated to indicate that it was loaded into the cache as the result of a prefetch operation. If the line or lines selected for eviction are not annotated, then the selected line or lines may be evicted from the instruction cache (block 1306). Once the selected line or lines have been evicted, the method may conclude in block 1307.

Alternatively, if the selected line or lines are annotated as being stored in the instruction cache as part of a prefetch operation, then confidence counters associated with the entry in the prefetch table corresponding to the selected line or lines may be decremented (block 1305). In various embodiments, the entry in the prefetch table corresponding to the selected line or lines may be identified in the prefetch table. It is noted that in some cases, a prefetch table entry may have been replaced after a prefetch was issued, but before the line filled into the instruction cache was used or evicted. In such cases, a comparison of the addresses contained in the cache line and the address in the prefetch table entry may be compared to avoid over-writing an updated prefetch table entry.

Once the entry has been identified, a value of the associated confidence counter may be decremented. When the value of the confidence counter reaches a minimum value, such as, e.g., zero, no further prefetches may be made for the line or lines corresponding to that particular entry in the prefetch table. Once the confidence counter has been decremented, the method may proceed from block 1306 as described above.

It is noted that the method depicted in the flow diagram of FIG. 13 is merely an example. In other embodiments, different operations and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a memory configured to store a table, wherein the table includes a plurality of entries; and
   circuitry configured to:
   receive a first instruction and a second instruction; and
   in response to a determination that the first instruction initiates a transition between a first function or subroutine and a second function or subroutine, update a signature by performing a processing operation on previous call or return target addresses;
   in response to a cache miss determination, generate a training signature using a previous signature that was valid at a time period before the cache miss;
   store the training signature in a particular entry of the plurality of entries;
   search the plurality of entries in response to a determination that the signature has been updated;
   determine a candidate prefetch operation in response to a determination that the signature matches a given entry of the plurality of entries; and
   initiate the candidate prefetch operation based on a predicted usefulness of the candidate prefetch operation.

2. The apparatus of claim 1, wherein to generate the training signature the circuitry is configured to determine the training signature using contents of a return-address stack delayed by a number of call/return transitions.

3. The apparatus of claim 2, wherein to update the plurality of entries, the circuitry is further configured to select a particular entry of the plurality of entries for replacement based on a usefulness associated with the particular entry.

4. The apparatus of claim 2, wherein to update the plurality of entries, the circuitry is further configured to update the plurality of entries based on a usefulness of a previous prefetch operation.

5. The apparatus of claim 1, wherein to generate the training signature, the circuitry is configured to delay a change in the signature by a particular number of call/return transitions.

6. The apparatus of claim 1, wherein the circuitry is further configured to update the signature in response to the determination that the first instruction initiates the transition between the first function or subroutine and the second function or subroutine based on a history of branch instructions, wherein the history of branch instructions is sampled in response to a detection of a call or return function.

7. The apparatus of claim 1, wherein to search the plurality of entries, the circuitry is further configured to check a filter, wherein the filter includes at least one filter entry corresponding to a signature used in a previous search of the plurality of entries.

8. A method, comprising:
receiving a first instruction and a second instruction;
in response to determining that the first instruction initiates a transition between a first function or subroutine and a second function or subroutine, updating a signature by performing processing operation on previous call or return target addresses;
in response to detecting a cache miss, generating a training signature using a previous signature that was valid at a time period before the cache miss;
storing the training signature in a particular entry of a plurality of entries that are stored in a memory;
searching the plurality of entries, in response to a determination that the signature has been updated;
determining a candidate prefetch operation in response to determining that the signature matches a given entry of the plurality of entries; and
initiating the candidate prefetch operation based on a predicted usefulness of the candidate prefetch operation.

9. The method of claim 8, further comprising updating the plurality of entries in response to detecting the cache miss, wherein the cache miss results in a delay in fetching a new instruction.

10. The method of claim 9, wherein updating the plurality of entries comprises selecting a particular entry of the plurality of entries for replacement based on a usefulness associated with the particular entry.

11. The method of claim 8, further comprising updating the plurality of entries based on a usefulness of a previous prefetch operation.

12. The method of claim 8, wherein generating the training signature includes delaying a change in the signature by a particular number of call/return transitions.

13. The method of claim 8, further comprising updating the signature in response to determining that the first instruction initiates the transition between the first function or subroutine and the second function or subroutine based on a history of branch instructions, wherein the history of branch instructions is sampled in response to a detection of a call or return function.

14. A system, comprising:
a memory; and
a processor including an instruction cache, wherein the processor is configured to:
fetch a first instruction and a second instruction from the instruction cache;
in response to a determination that the first instruction initiates a transition between a first function or subroutine and second function or subroutine, update a signature by performing a processing operation on previous call or return target addresses;
in response to a cache miss, generate a training signature using a previous signature valid at a time period before the cache miss;
store the training signature in a particular entry of a plurality of entries that is stored in a table included in the memory;
search the plurality of entries, in response to a determination that the signature has been updated;
determine a candidate prefetch operation in response to a determination that the signature matches a given entry of the plurality of entries; and
initiate the candidate prefetch operation based on a predicted usefulness of the candidate prefetch operation.

15. The system of claim 14, wherein the processor is further configured to update the plurality of entries in response to a detection of the cache miss, wherein the cache miss results in a delay in fetching a new instruction.

16. The system of claim 15, wherein to update the plurality of entries, the processor is further configured to select a particular entry of the plurality of entries for replacement based on a usefulness associated with the particular entry.

17. The system of claim 15, wherein the processor is further configured to update the plurality of entries based on a usefulness of a previous prefetch operation.

18. The system of claim 14, wherein the processor is further configured to update the signature in response to the determination that the first instruction initiates the transition in function based on a history of received call or return instructions.

19. The system of claim 14, wherein to generate the training signature, the processor is configured to delay a change in the signature by a particular number of call/return transitions.

20. The system of claim 14, wherein to search the plurality of entries, the processor is further configured to check a filter, wherein the filter includes at least one filter entry corresponding to a signature used in a previous search of the plurality of entries.

* * * * *